United States Patent
Mitsutani

(10) Patent No.: US 8,686,591 B2
(45) Date of Patent: Apr. 1, 2014

(54) ELECTRICALLY-DRIVEN VEHICLE AND CHARGE CONTROL SYSTEM WHICH ENABLE SIMULTANEOUS PERFORMANCE OF DRIVING OF AN ACCESSORY UNIT AND A CHARGING PROCESS OF A BATTERY

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 212 days.

(21) Appl. No.: 12/585,291

(22) Filed: Sep. 10, 2009

(65) Prior Publication Data

US 2010/0072953 A1    Mar. 25, 2010

(30) Foreign Application Priority Data

Sep. 24, 2008   (JP) .................................. 2008-244149

(51) Int. Cl.
*H02H 7/18*   (2006.01)
(52) U.S. Cl.
USPC ........................................ 307/10.7; 320/134
(58) Field of Classification Search
USPC ............ 320/DIG. 10, DIG. 11, DIG. 12, 152, 320/162, 134; 307/10.7
See application file for complete search history.

(56) References Cited

U.S. PATENT DOCUMENTS

| | | | | |
|---|---|---|---|---|
| 2,662,190 A | * | 12/1953 | Van Weijnsbergen | 307/66 |
| 5,576,611 A | * | 11/1996 | Yoshida | 320/152 |
| 5,656,916 A | * | 8/1997 | Hotta | 320/160 |
| 6,239,580 B1 | * | 5/2001 | Toya | 320/149 |
| 6,304,061 B1 | * | 10/2001 | Toya | 320/134 |
| 2005/0269880 A1 | * | 12/2005 | Konishi | 307/10.7 |
| 2006/0208691 A1 | * | 9/2006 | Sugiura et al. | 320/101 |
| 2007/0182248 A1 | * | 8/2007 | Blaker et al. | 307/10.1 |
| 2008/0278111 A1 | * | 11/2008 | Genies et al. | 320/101 |

FOREIGN PATENT DOCUMENTS

| | | |
|---|---|---|
| EP | 2 197 086 A1 | 6/2010 |
| JP | A-7-194015 | 7/1995 |
| JP | A-8-336236 | 12/1996 |
| JP | A-10-108379 | 4/1998 |
| JP | A-11-098697 | 4/1999 |
| JP | A-2000-217206 | 8/2000 |
| JP | A-2001-63347 | 3/2001 |
| JP | A-2002-325373 | 11/2002 |
| JP | A-2002-330552 | 11/2002 |
| JP | A-2008-199761 | 8/2008 |
| JP | A-2009-071902 | 4/2009 |

\* cited by examiner

*Primary Examiner* — Yalkew Fantu
*Assistant Examiner* — Manuel Hernandez
(74) *Attorney, Agent, or Firm* — Oliff PLC

(57) ABSTRACT

An electrically-driven vehicle 10 comprises a chargeable and dischargeable battery 20, a charger 16 that charges the battery 20 using a supply of electric power from an external power supply 100, an accessory unit 19 that is driven by a supply of electric power from at least one of the battery 20 and the charger 16; and a PM-ECU 18 that controls drive of the charger 16 so that the charged amount of the battery does not exceed a predetermined charging upper limit. The PM-ECU 18 sets the charging upper limit used when the accessory unit 19 is being driven, lower than the charging upper limit used when the accessory unit 19 is not being driven in order to avoid overcharging when excessive electric power is supplied from the accessory unit 19 to the battery 20.

5 Claims, 7 Drawing Sheets

ELECTRICALLY-DRIVEN VEHICLE AND CHARGE CONTROL SYSTEM WHICH ENABLE SIMULTANEOUS PERFORMANCE OF DRIVING OF AN ACCESSORY UNIT AND A CHARGING PROCESS OF A BATTERY

PRIORITY INFORMATION

This application claims priority to Japanese Patent Application No. 2008-244149, filed on Sep. 24, 2008, which is incorporated herein by reference in its entirety.

TECHNICAL FIELD

The present invention relates to an electrically-driven vehicle equipped with a chargeable and dischargeable battery which is charged by a supply of electric power from an electric power source and also relates to a charge control system which controls a charging operation of the battery in the electrically-driven vehicle.

BACKGROUND ART

Electrically-driven vehicles, such as an electric vehicle or hybrid vehicle, equipped with a battery as a source of power have been known for many years. Among such electrically-driven vehicles, some vehicles can charge a battery by a supply of electric power from an electric power source, for example, an external power supply. In such a vehicle, the electric power supplied from an external power supply or the like may be used not only for charging a battery, but also for driving electric equipment (accessory unit) such as an air conditioning system or audio system. For example, in winter and summer, pre-air conditioning is often performed for preliminary air conditioning the vehicle interior before getting into a vehicle (that is, while the vehicle is at a stop). Techniques have been proposed that when this pre-air conditioning is performed during an external charging, that is, with a charger and an external power supply being connected, the electric power supplied from the external power supply is supplied not only to the battery but also to the air conditioning system (for example, JP 2001-63347 A). Such an arrangement enables an effective charging operation of a battery.

SUMMARY OF INVENTION

However, when electric power from an external power supply is also supplied to an accessory unit, there is a risk of damage to a battery due to overcharging. More specifically, when the supply of electric power from the external power supply to the accessory unit becomes excessive, the excessive electric power is output to the battery side. If the battery is fully charged at this point, overcharging occurs resulting in damage to the battery or a shortened battery life. JP 10-108379 A discloses techniques for restricting driving of an accessory unit while externally charging a battery in order to avoid this problem. However, in accordance with such techniques, pre-air conditioning or other functions are restricted causing a problem of loss of convenience.

Thus, an object of the present invention is to provide an electrically-driven vehicle and a charge control system which enable simultaneous performance of driving of an accessory unit and a charging process of a battery.

An electrically-driven vehicle according to an embodiment of the present invention comprises a chargeable and dischargeable battery mounted on the vehicle as one of sources of power; a charger that charges the battery by a supply of electric power from an electric power source; an accessory unit that is driven by electric power supplied from at least one of the battery and the charger; a charged amount obtaining unit that obtains a charged amount of the battery; and a controller that controls drive of the charger so that the charged amount of the battery obtained by the charged amount obtaining unit does not exceed a predetermined charging upper limit, wherein for charging the battery by the supply of electric power from the electric power source, the controller sets the charging upper limit used when an accessory unit is being driven to lower than a charging upper limit used when an accessory unit is not being driven.

In a preferable aspect of the present invention, a temperature detector that detects the battery temperature is further included. When the accessory unit is being driven, the controller changes the charging upper limit in accordance with a temperature detected by the temperature detector. Further, it is preferable that the controller stops the supply of electric power from the charger to the accessory unit when the charged amount of the battery exceeds the charging upper limit. It is further preferable that when the controller is capable of controlling charging with a plurality of types of control method, including a constant voltage control method in which charging is performed while estimating the charged amount and maintaining a constant voltage, the controller controls charging using a control method other than the constant voltage control method when the accessory unit is being driven. It is still further preferable that the electric power source is an external power supply provided externally to the vehicle.

Another aspect of the present invention is to provide a charge control system that controls a charging operation of a battery in an electrically-driven vehicle comprising a chargeable and dischargeable battery charged by a supply of electric power from an electric power source and an accessory unit driven by electric power supplied from at least one of the battery and the electric power source. The charge control system comprises a charger that charges the battery by the supply of electric power from the electric power source; a charged amount obtaining unit that obtains a charged amount of the battery; and a controller that controls drive of the charger so that the charged amount of the battery obtained by the charged amount obtaining unit does not exceed a predetermined charging upper limit, wherein for charging the battery by the supply of electric power from the electric power source, the controller sets a charging upper limit used with the accessory unit in drive lower than a charging upper limit used with the accessory unit not in drive.

According to the present invention, as a charging upper limit is lower while the accessory unit is being driven, overcharging is unlikely to occur even when excessive electric power is supplied from the accessory unit to the battery. Therefore, driving of the accessory unit and the charging processes of the battery can be simultaneously performed.

DESCRIPTION OF THE EMBODIMENTS

Figure 1:
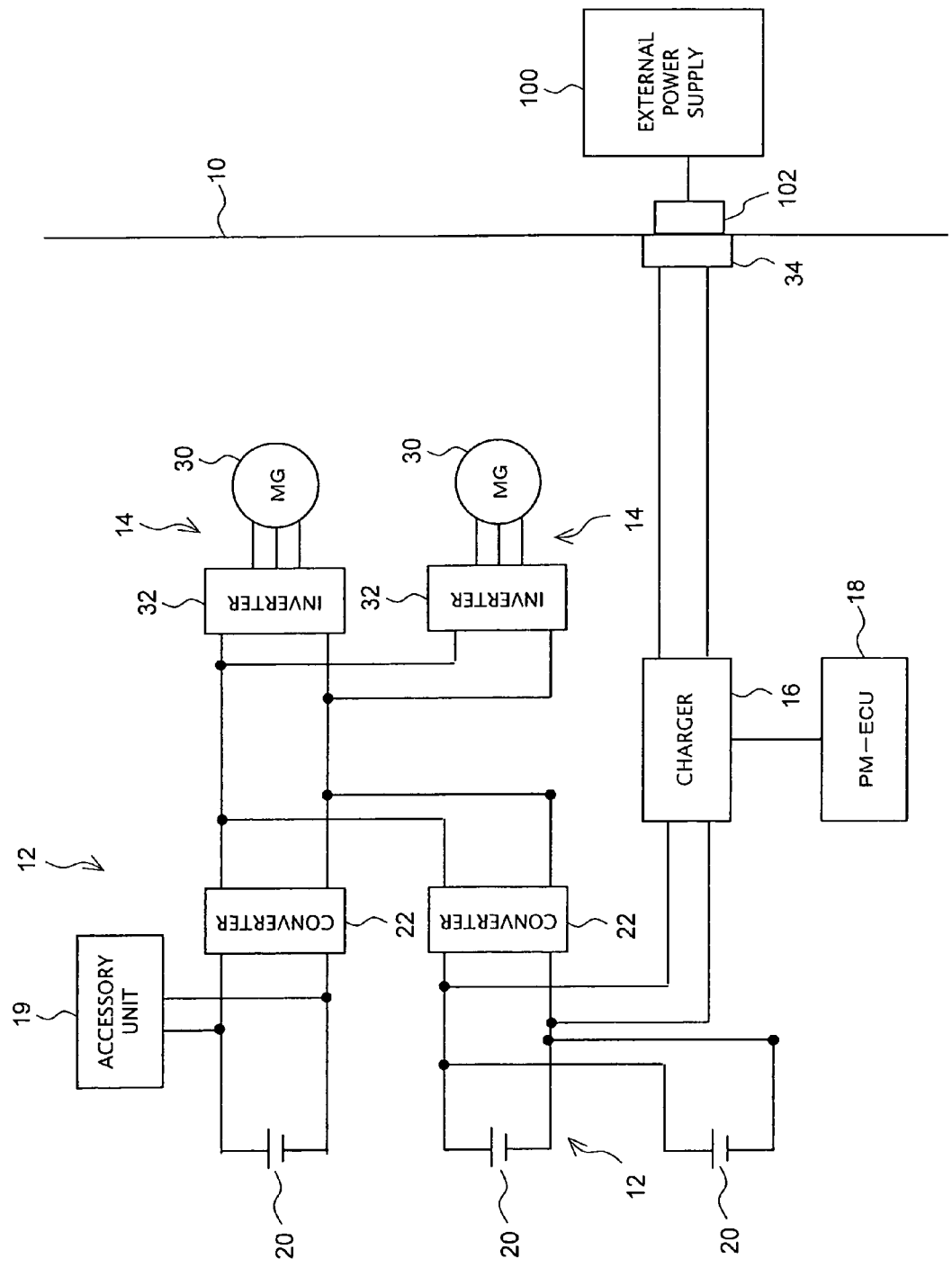
FIG. 1 is a schematic block diagram of portions relating to charging operations in an electrically-driven vehicle in accordance with an embodiment of the present invention.

Preferred embodiments of the present invention are described below with reference to the accompanying drawings. FIG. 1 is a schematic block diagram of portions relating to charging operations in an electrically-driven vehicle 10 in accordance with an embodiment of the present invention. The electrically-driven vehicle 10 is a vehicle which uses output electric power from a battery 20 as one of sources of power, for example, a hybrid vehicle and an electric vehicle.

The electrically-driven vehicle 10 has a plurality of power supply units 12 connected in parallel, each of which includes the battery 20 and a converter 22. Each battery 20 comprises a chargeable and dischargeable secondary battery, such as a lithium-ion battery. The converter 22 is disposed between the battery 20 and a motor unit 14 for increasing and decreasing a supplied voltage as necessary.

The power supply units 12 have a plurality of motor units 14 connected to them. Each of the motor units 14 comprises a motor 30 and an inverter 32. The motor 30 functions not only as a motor which generates a torque for driving vehicle wheels but also as a generator for generating regenerative electric power upon braking. During running of the vehicle, the battery 20 supplies electric power to the motor 30, and also the battery 20 is charged by the regenerative electric power generated by the motor 30. The inverter 32 is disposed between the motor 30 and the battery 20 for performing AC-DC conversion as necessary.

One of the power supply units 12 has an accessory unit 19 connected to it. The accessory unit 19 may be electrical equipment such as an air-conditioning system, audio system, and cooling fan, as well as a circuit unit including a voltage converter such as a DC-DC converter, as necessary. Although the accessory unit 19 is usually driven by battery electric power supplied from the battery 20, the accessory unit 19 is also driven by external electric power supplied from an external power supply 100 during external charging of the battery 20 by the external power supply 100.

A charger 16 is a component which is included in a charge control system together with a below-described PM-ECU 18 and various sensors provided with the battery 20. The charger 16 charges the battery 20 using external electric power supplied from the external power supply 100 which is an electric power source. The charger 16 is connectable to the external power supply 100 via a power receiving connector 34 disposed on the vehicle surface and a power feeding connector 102 disposed with the external power supply 100. The charger 16 supplies electric power supplied from the external power supply 100 to the battery 20 after boosting or DC converting the electric power as necessary. Furthermore, when the accessory unit 19 is being drive while performing the external charging, the charger 16 also supplies the external electric power supplied from the external power supply 100 to the accessory unit 19.

The PM-ECU (Power Management Electric Control Unit) 18 is a controller which controls the drive of the charger 16. The PM-ECU 18 calculates an SOC (State of Charge) based on a battery temperature, electric current value, and electric voltage value detected by various sensors (not shown) provided with the battery 20. The PM-ECU 18 also calculates required amount of electric power in accordance with the calculated SOC and driving status of the accessory unit 19 in order to control the drive of the charger 16 so that the required amount of electric power is output from the charger 16.

More specifically, the PM-ECU 18 calculates a charge electric power Wv which is a required electric power for charging the battery 20 based on an SOC deviation $\Delta C$. The SOC deviation $\Delta C$ is a difference between a predetermined charging upper limit F and the calculated battery SOC ($\Delta C = F - SOC$). The PM-ECU 18 also estimates electric power consumption Xs of the accessory unit 19 and calculates an accessory driving electric power Ws which is required electric power for driving the accessory unit 19. Then, the PM-ECU 18 controls the drive of the charger 16 so that demand electric power W which is a sum of the charge electric power Wv and the accessory driving electric power Ws is output from the charger 16.

It should be noted that the supply of electric power to the battery 20 continues until the battery SOC reaches the charging upper limit F. In other words, the charging upper limit F is a reference value used to determine whether or not to stop a charging operation of the battery 20. In conventional electrically-driven vehicles 10, the charging upper limit F is often set as a fixed value regardless of the driving status of the accessory unit 19. However, if the charging upper limit F is set as a fixed value, it becomes impossible to absorb a rapid change of the electric power consumption Xs of the accessory unit 19, resulting in possible overcharge of the battery 20. This is described below with reference to FIG. 7.

Figure 7:
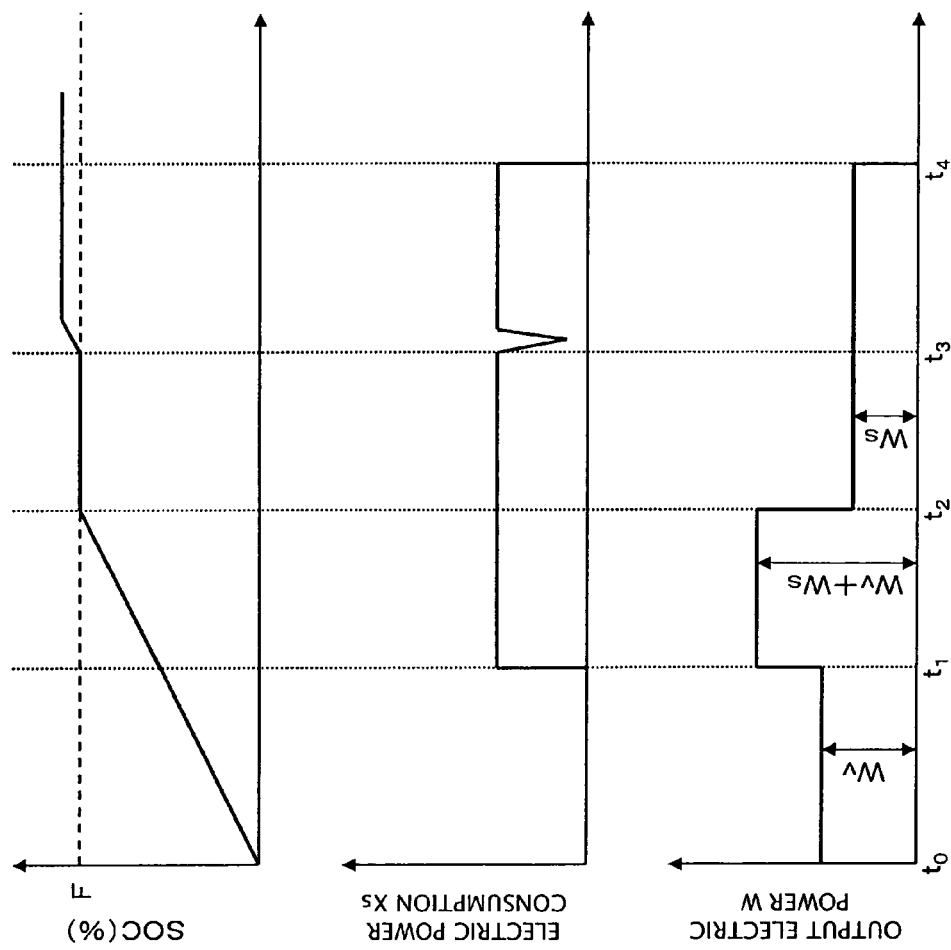
FIG. 7 is a diagram showing an exemplary relationship among an SOC, electric power consumption of an accessory unit, and output electric power from a charger in accordance with conventional electrically-driven vehicles.

FIG. 7 is a diagram showing an exemplary relationship, in a conventional electrically-driven vehicle, among the battery SOC, electric power consumption Xs of the accessory unit 19, and output electric power W from the charger 16. In FIG. 7, the graph on the top shows the battery SOC, the graph in the middle shows the electric power consumption Xs of the accessory unit 19, and the graph on the bottom shows the change in the output electric power W from the charger 16.

In FIG. 7, it is assumed that external charging starts at time $t_0$ with the power feeding connector 102 of the external power supply 100 connected to the power receiving connector 34 provided with the vehicle. At this point, the charger 16 outputs the charge electric power Wv required for charging the battery 20. With this supply of electric power from the charger 16, the battery SOC gradually increases. It should be noted that although the actual charge electric power Wv often changes in accordance with the difference between the charging upper limit F and the battery SOC, the charge electric power Wv in this description is assumed, for ease of explanation, to be constant until the battery SOC reaches the charging upper limit F.

Then, it is assumed that the driving of the accessory unit 19 starts at time $t_1$. At this point, the charger 16 outputs electric power (Wv+Ws) obtained by adding the charge electric power Wv and the accessory driving electric power Ws, which is an estimated power required for driving the accessory unit 19.

Then, it is assumed that the battery SOC reaches the charging upper limit F at time $t_2$. At this point, the charger 16 stops supplying electric power to the battery 20. On the other hand, because the drive of the accessory unit 19 is continued, the charger 16 continues to output the accessory driving electric power Ws even after time $t_2$ when the battery SOC reaches the charging upper limit F.

It should be noted that no problem will occur if the accessory driving electric power Ws is stably consumed by the accessory unit 19. However, as shown at time $t_3$, a temporary rapid drop of the electric power consumption Xs of the accessory unit 19 may occur for any reason. In such a case, it is preferable in principle that the output electric power from the charger 16 rapidly decreases in response to this rapid drop of the electric power consumption. However, because it is actually not likely to be able to respond to such a rapid change, it can be considered that electric power larger than the actual electric power consumption Xs will be output from the charger 16. As a result, excessive power which cannot be consumed by the accessory unit 19 is generated. Such excessive power is usually output and charged to the battery 20.

It should be noted that the battery 20 has already reached the charging upper limit F at time $t_2$. Therefore, further supply of electric power may cause overcharging resulting in damage to the battery 20 or a shortened battery life due to the overcharging. To avoid such a problem, techniques have been disclosed to restrict driving of the accessory unit 19 while the external charging of the battery 20 is in progress. However, setting such a restriction on the drive of the accessory unit 19 means that, for example, performance of pre-air conditioning for preliminary air conditioning of the vehicle interior before getting into a vehicle is also restricted, resulting in a problem of loss of convenience. Alternatively, it may also be possible to set the charging upper limit F to a lower value to the extent that the battery 20 is not damaged even with some excessive electric power. However, in such a case, there still remains a problem that the battery 20 is not sufficiently charged.

In an embodiment of the present invention, in order to avoid these problems, the charging upper limit F, which is a reference value used to determine whether or not to stop the charging of the battery 20, is changed in accordance with the driving status of the accessory unit 19. More specifically, in the present embodiment, a second upper limit $F_2$, which is the charging upper limit F while the accessory unit 19 is being driven, is set lower than a first upper limit $F_1$ which is the charging upper limit F while the accessory unit 19 is not being driven ($F_2 < F_1$). In this way, it becomes possible to avoid the problems such as damage of the battery 20 due to overcharging. This is described below with reference to FIG. 2.

Figure 2:
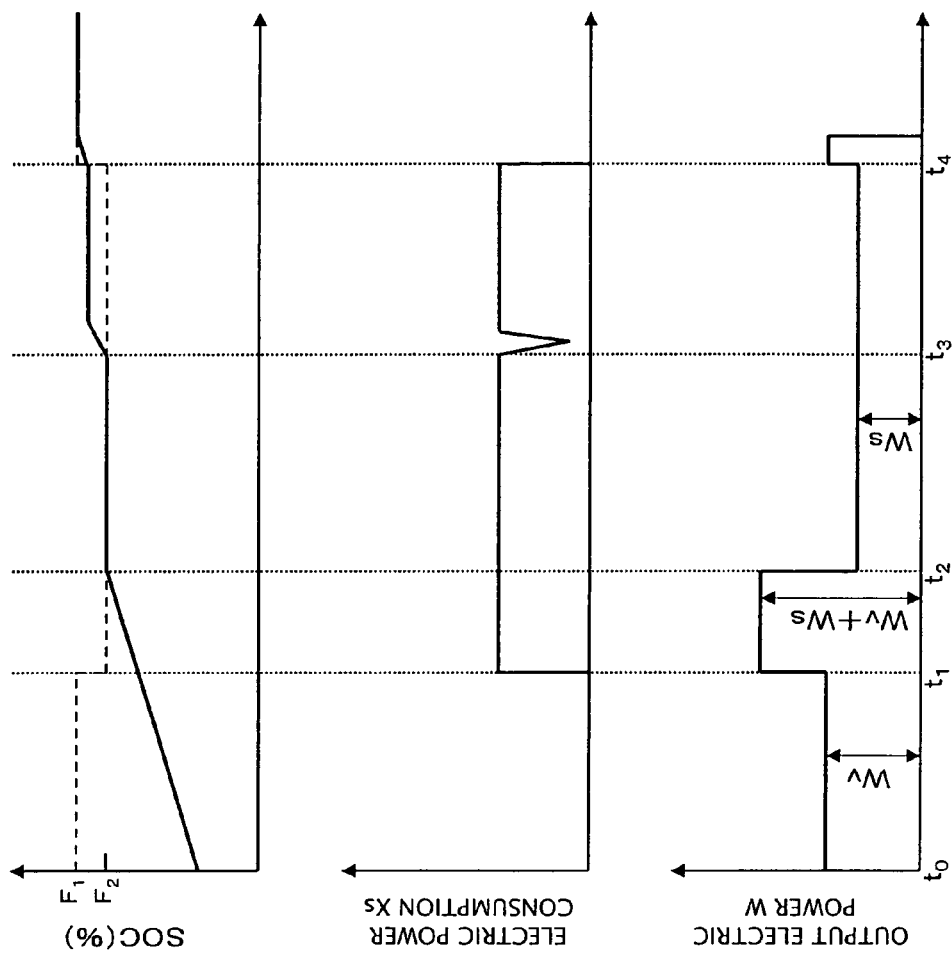
FIG. 2 is a diagram showing an exemplary relationship among an SOC, electric power consumption of an accessory unit, and output electric power from a charger in accordance with an embodiment of the present invention.

FIG. 2 is a diagram showing a relationship among the battery SOC, electric power consumption Xs of the accessory unit 19, and output electric power W from the charger 16. In FIG. 2, the graph on the top shows the battery SOC, the graph in the middle shows the electric power consumption Xs of the accessory unit 19, and the graph on the bottom shows the change in the output electric power W from the charger 16. The dashed line in the top graph indicates the change in the charging upper limit F.

Now, it is assumed that the supply of electric power from the external power supply 100 to the charger 16 starts at time $t_0$. At this point, the PM-ECU 18 determines whether or not the battery SOC has reached the first upper limit $F_1$. If not, the PM-ECU 18 instructs the charger 16 to output the charge electric power Wv. With this charge electric power Wv, the battery SOC gradually increases.

Then, it is assumed that the driving of the accessory unit 19 starts at time $t_1$. At this point, the PM-ECU 18 switches the charging upper limit F from the first upper limit $F_1$ to the second upper limit $F_2$. The second upper limit $F_2$ is set lower than the first upper limit $F_1$ so that problems such as damage to the battery 20 due to overcharging can be avoided even with some excessive electric power. After the drive of the accessory unit 19 is started, the PM-ECU 18 monitors whether or not the battery SOC reaches the second upper limit $F_2$.

Then, it is supposed that the battery SOC reaches the second upper limit $F_2$ at time $t_2$. At this point, the PM-ECU 18 instructs the charger 16 to stop supplying the charge electric power Wv to the battery 20. Upon receiving this instruction, the charger 16 outputs only the accessory driving electric power Ws which is required for driving the accessory unit 19.

Then, it is assumed that a rapid drop of the electric power consumption Xs of the accessory unit 19 temporarily occurs at time $t_3$ and the charger 16 cannot respond to this rapid drop of the electric power consumption. In such a case, excessive electric power that the accessory unit 19 cannot consume is generated. The battery 20 is further charged with this excessive electric power. However, because the battery SOC at time $t_3$ is the second upper limit $F_2$ in this embodiment, it is arranged that the battery 20 is not damaged due to overcharging even with some excessive electric power. Therefore, a problem does not occur even when the excessive electric power is supplied to the battery 20 at time $t_3$.

Subsequently, it is assumed that the driving of the accessory unit 19 is stopped at time $t_4$. Then, the PM-ECU 18 switches the charging upper limit from the second upper limit $F_2$ to the first upper limit $F_1$. If the battery SOC has not reached the first upper limit $F_1$ at this point, the charger 16 is driven to supply the charge electric power Wv to the battery 20 until the battery SOC reaches the first upper limit $F_1$. In this way, it becomes possible to store a sufficient amount of electric power in the battery 20.

As will be apparent from the above description, damage to the battery 20 due to overcharging is avoided while making it possible to store a sufficient amount of electric power by switching the charging upper limit of the battery 20 in accordance with the driving status of the accessory unit 19, that is, a status of an electric load connected to the battery 20.

Figure 3:
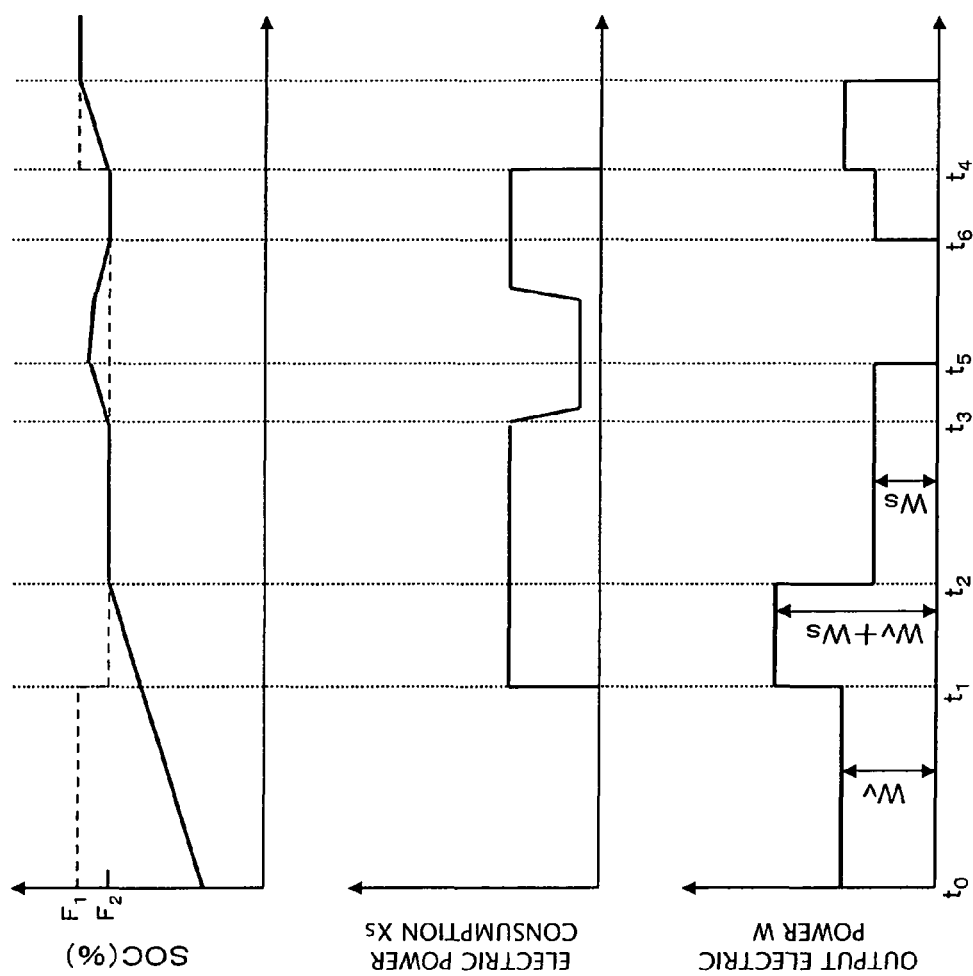
FIG. 3 is a diagram showing another exemplary relationship among an SOC, electric power consumption of an accessory unit, and output electric power from a charger in accordance with an embodiment of the present invention.

It should be noted that in the above description, the external electric power continues to be supplied to the accessory unit 19 even after the battery SOC has reached the second upper limit $F_2$. However, in an actual implementation, the supply of the external electric power to the accessory unit 19 is blocked after the battery SOC exceeds the charging upper limit. For example, it is assumed that, as shown in FIG. 3, the battery SOC exceeds the second upper limit $F_2$ due to the rapid drop of the electric power consumption of the accessory unit 19 at time t3. In this case, upon detection of such an excess at time $t_5$, the PM-ECU 18 blocks a gate (not shown) disposed between the charger 16 and the accessory unit 19 so as to stop the supply of the external electric power to the accessory unit 19. The electric power required to drive the accessory unit 19 is supplied from the battery 20. As a result, the battery SOC gradually decreases after time $t_5$ when the gate is blocked, then drops down to the second upper limit $F_2$ at time $t_6$. Upon sensing that the battery SOC has dropped down to the second upper limit $F_2$, the PM-ECU 18 releases the gate between the charger 16 and the accessory unit 19 to resume supplying the external electric power to the accessory unit 19.

As such, it is possible to reliably prevent damage to the battery 20 due to overcharging by stopping the supply of the external electric power to the accessory unit 19 when the battery SOC exceeds the charging upper limit F, resulting in an active supply of the excessive electric power of the battery 20 to the accessory unit 19.

Figure 4:
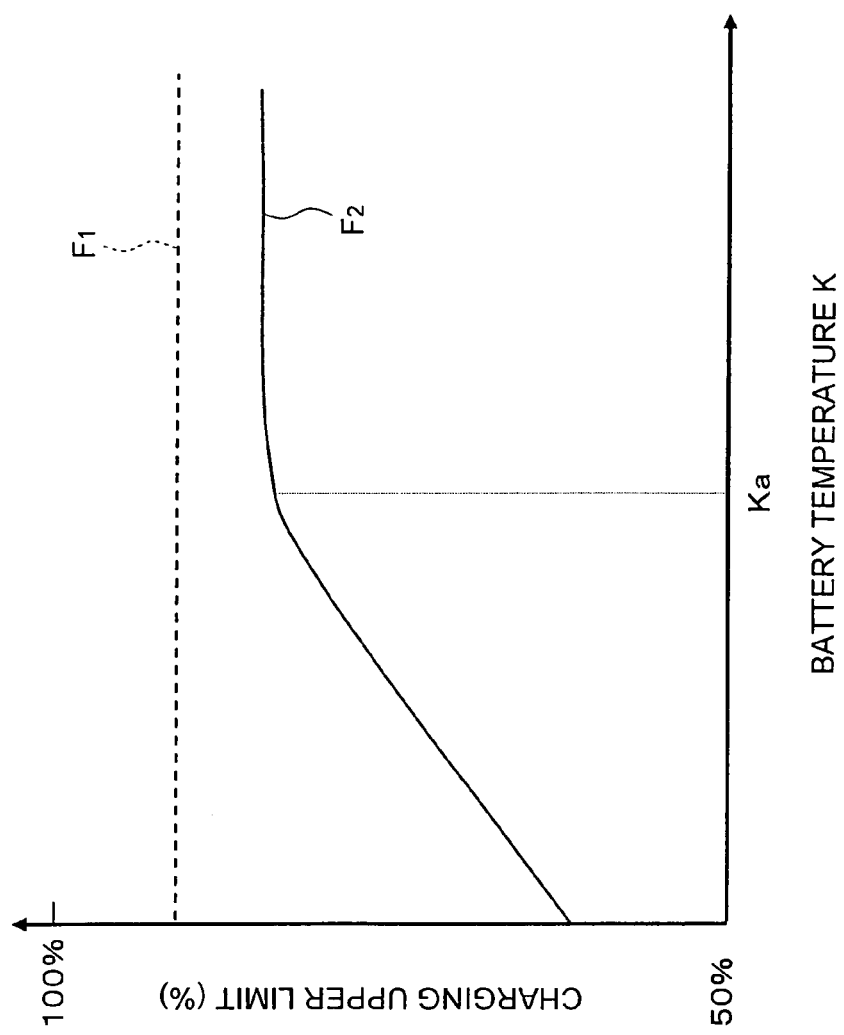
FIG. 4 is a diagram showing a map of charging upper limit in accordance with an embodiment of the present invention.

Additionally, in the above description, the second upper limit $F_2$ is described as a fixed value. However, in an actual implementation, the second upper limit $F_2$ is a variable value which changes in accordance with a battery temperature. FIG. 4 is a diagram showing an exemplary map of the charging upper limit used in this embodiment. In FIG. 4, the horizontal axis shows a battery temperature K, while the vertical axis shows the charging upper limit F. Further, the solid line shows an example of the second upper limit $F_2$ which changes in accordance with the battery temperature K, while the dashed line shows the first upper limit $F_1$ which is a fixed value regardless of the battery temperature K. As shown in FIG. 4, it is preferable that the second upper limit $F_2$ increases as the battery temperature rises, until the battery temperature K reached a certain reference value Ka. This is because electrical characteristics in the periphery of the battery 20 change in accordance with the battery temperature K. By changing the second upper limit $F_2$ in accordance with the battery temperature K, it becomes possible to handle a change of the electrical characteristics due to a change in the battery temperature K. Therefore, a more appropriate charging operation of the battery 20 becomes available.

Figure 5:
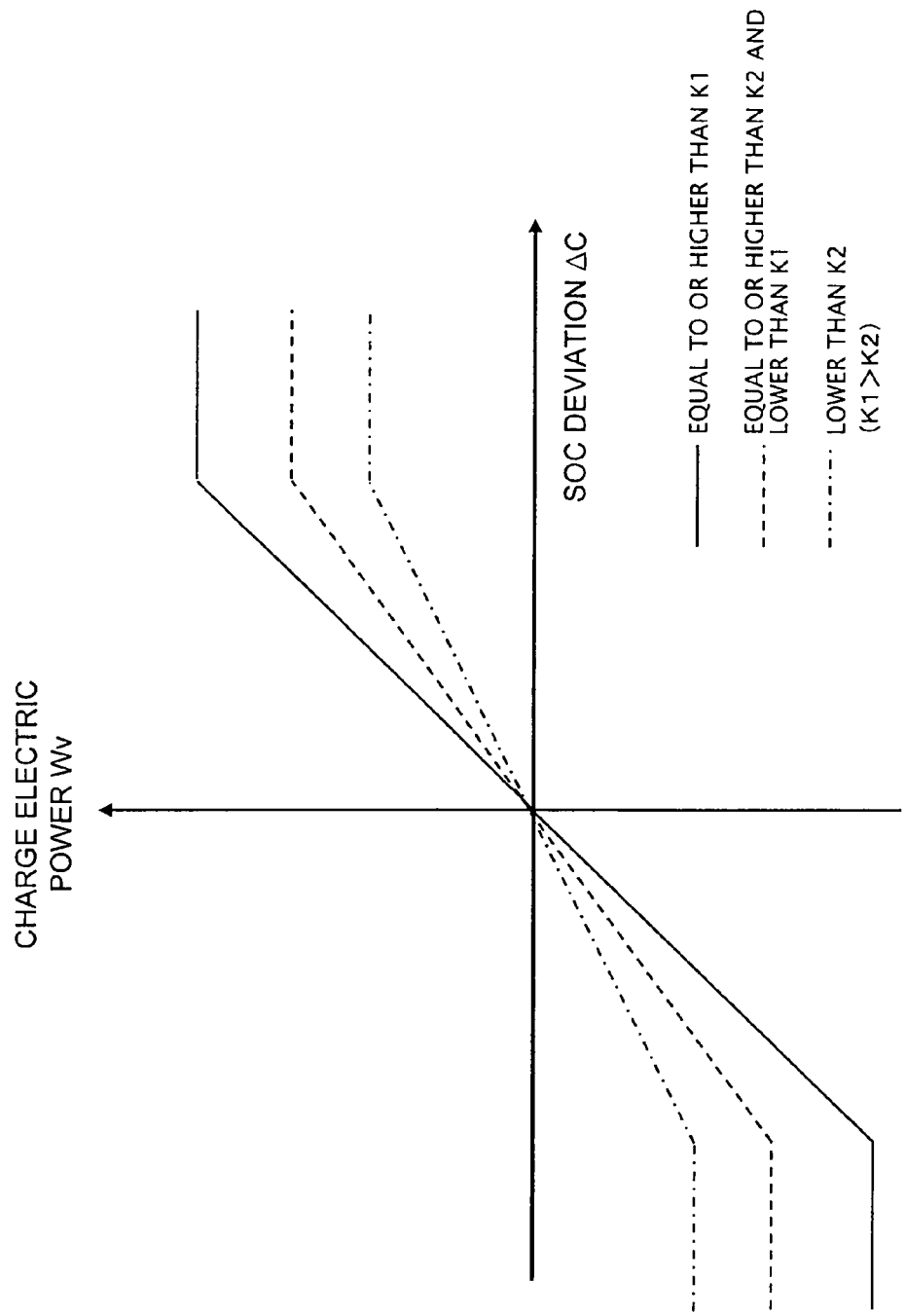
FIG. 5 is a diagram showing a map of charge electric power in accordance with an embodiment of the present invention.

Further, in the above description, the charge electric power Wv which is output from the charger 16 is set as a fixed value. However, in an actual implementation, the charge electric power Wv is changed in accordance with the SOC deviation ΔC and the battery temperature. More specifically, the charge electric power Wv is calculated based on a charge electric power map shown in FIG. 5 or the like. In FIG. 5, the horizontal axis shows the SOC deviation ΔC, while the vertical axis shows the charge electric power Wv. It should be noted that the SOC deviation ΔC is a difference between the charging upper limit F and the calculated battery SOC. Therefore, ΔC=$F_1$−SOC when the accessory unit 19 is not being driven, while ΔC=$F_2$−SOC when the accessory unit 19 is being driven. Further, a solid line, dashed line, and dashed dotted line in FIG. 5 show the charge electric power Wv with the battery temperature K≥K1, K2≤K<K1, and K<K2 (K1>K2) respectively.

As will be apparent from FIG. 5, the charge electric power Wv becomes lower as the SOC deviation ΔC, which is a difference between the charging upper limit F and the battery SOC, becomes lower. Such an arrangement enables a reduction in the possibility that the battery SOC will exceed the charging upper limit F, enabling more sufficient charging of the battery 20. Further, the charge electric power Wv decreases as the battery temperature K falls. Such an arrangement makes it possible to handle a change of the electrical characteristics due to a change in the battery temperature K, resulting in a better charging operation of the battery 20.

Figure 6:
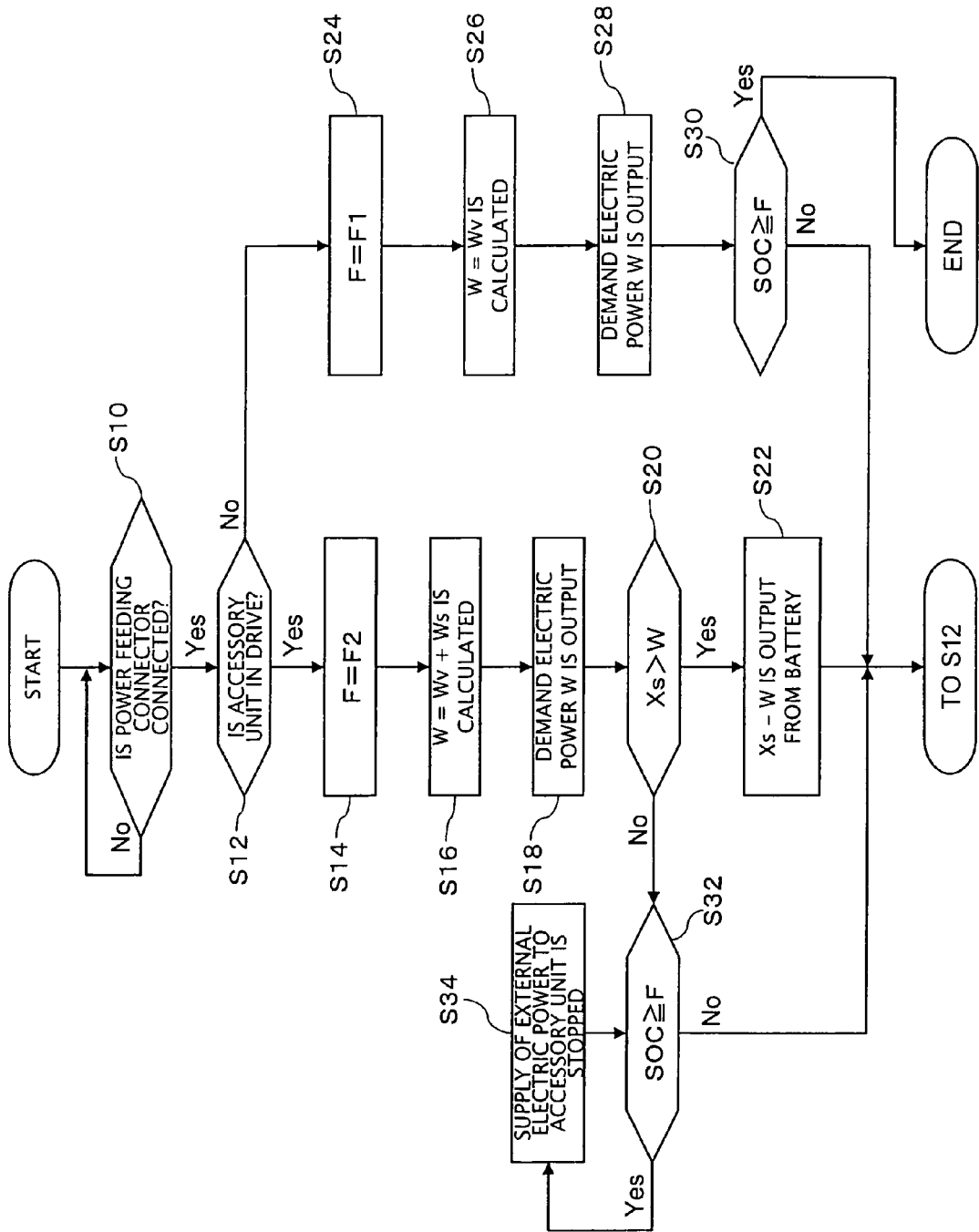
FIG. 6 is a flowchart showing a flow of charging processes in accordance with an embodiment of the present invention.

A flow of charging processes in accordance with an embodiment of the present invention is described below with reference to FIG. 6. FIG. 6 is a flowchart showing a flow of charging processes. The charging operation is started when the power feeding connector 102 disposed with the external power supply 100 is connected to the power receiving connector 34 disposed on the vehicle surface. More specifically, the charging operation is started when the PM-ECU 18 detects the connection of the power feeding connector 102 (S10). Upon detection of the connection of the power feeding connector 102, the PM-ECU 18 successively checks the driving status of the accessory unit 19 (S12). When the accessory unit 19 is being driven, the PM-ECU 18 sets the second upper limit $F_2$ as the charging upper limit F (S14). It should be noted that it is preferable for the second upper limit $F_2$ to be changed in accordance with the battery temperature K. That is, when the PM-ECU 18 determines that the accessory unit 19 is being driven, the PM-ECU 18 obtains the battery temperature by using a temperature sensor disposed with the battery 20. It is preferable that the second upper limit $F_2$ is calculated by applying the obtained battery temperature to the charging upper limit map shown in FIG. 4 or the like.

After calculating the charging upper limit F (the second upper limit $F_2$), the PM-ECU 18 successively calculates demand electric power W which is to be output from the charger 16 (S16). The demand electric power W is a sum of the charge electric power Wv required for charging the battery 20 and the accessory driving electric power Ws required for driving the accessory unit 19 (W=Wv+Ws). It should be noted that, as described above, the charge electric power Wv is calculated based on the SOC deviation ΔC and the battery temperature K. More specifically, the PM-ECU 18 calculates the SOC deviation ΔC which is a difference between the battery SOC calculated based on the values detected by various sensors and the charging upper limit F (F=$F_2$) calculated in Step S14 (ΔC=F−SOC). Then, the charge electric power Wv required for charging is calculated by applying the calculated SOC deviation ΔC and the battery temperature K detected by the temperature sensor to the charge electric power map shown in FIG. 5.

Once the demand electric power is calculated, the PM-ECU 18 controls the drive of the charger 16 so that the calculated demand electric power W is output and supplied to the battery 20 and the accessory unit 19 (S18). The PM-ECU 18 successively compares the electric power consumption Xs of the accessory unit 19 with the demand electric power W which is output from the charger 16 (S20). If, as a result of the comparison, the electric power consumption Xs is larger and the demand electric power W alone causes a shortage, the PM-ECU 18 controls the drive of the battery 20 to output the shortage (S22). On the other hand, if the demand electric power W is equal to or higher than the electric power consumption Xs (Ws≥Xs), the PM-ECU 18 successively compares the battery SOC with the charging upper limit F (F=$F_2$) (S32). If, as a result of the comparison, the battery SOC is equal to or higher than the charging upper limit F, the PM-ECU 18 blocks a gate between the charger 16 and the accessory unit 19 to stop the supply of external electric power to the accessory unit 19 (S34). Then, the output electric power from the battery 20 continues to be supplied to the accessory unit 19 until the battery SOC drops down to the charging upper limit F. When the battery SOC drops down to the charging upper limit F, a process returns to Step S12, and processes after Step S12 are repeated.

It should be noted that if it is determined in Step S12 that the accessory unit 19 is not being driven, the PM-ECU 18 sets the first upper limit $F_1$ as the charging upper limit F (S24). As shown in FIG. 4, the first upper limit $F_1$ is larger than the second upper limit $F_2$ and also the first upper limit $F_1$ is a constant value regardless of the battery temperature K. After setting F=$F_1$, the PM-ECU 18 successively calculates the demand electric power W (S26). The demand electric power W is a sum of the charge electric power Wv and the accessory driving electric power Ws. However, as the accessory unit 19 is not being driven in Step S26, the demand electric power W=Wv. As described in above Step 16, the charge electric power Wv is calculated based on the SOC deviation ΔC, battery temperature K, and the charge electric power map shown in FIG. 5 or the like.

Once the demand electric power W is calculated, the PM-ECU 18 controls the drive of the charger 16 so that the charger 16 outputs the demand electric power W (S28). Then, the PM-ECU 18 compares the battery SOC with the charging upper limit F (F=$F_1$) (S30). If, as a result of the comparison, the battery SOC is equal to or higher than the charging upper limit F, the charging process is finished. On the other hand, if the battery SOC is lower than the charging upper limit F, a process returns to Step S12 and the same processes are repeated.

As will be apparent from the above description, according to embodiments of the present invention, the charging upper limit is lowered when the accessory unit 19 is being driven. In other words, it is always possible to allocate a buffer of a size corresponding to $(F_1-F_2)$ to absorb excessive electric power by the battery 20. Thus, even when the electric power consumption of the accessory unit 19 changes rapidly, the imbalance of the electric power due to the rapid change can be sufficiently absorbed. Therefore, various problems due to overcharging of the battery 20 can be avoided.

As a charging method of the battery 20, constant voltage charging (CV charging) in which a constant voltage is maintained while charging, and constant electric power charging (CP charging) in which a constant electric power is maintained while charging, are known. In the CV charging among these charging methods, charging is performed while estimating a charged amount based on a voltage value, and maintaining a constant voltage. In such a charging method in which a charged amount is estimated, there is a problem that an error easily occurs with the presence of a disturbance factor such as an accessory unit. Therefore, charging may be performed using another charging method such as the CP charging method to avoid the CV charging method when the accessory unit 19 which can be considered as an electrical load to the battery 20 is being driven, that is, when there is a disturbance factor.

Further, in the above description, an external power supply provided externally to a vehicle is used as an example of an electric power source for charging a battery. However, an in-vehicle fuel cell may be used as the electric power source for charging the battery.

The invention claimed is:

1. An electrically-driven vehicle, comprising:
    a chargeable and dischargeable battery mounted on the vehicle as one of sources of power;
    a charger that charges the battery by a supply of electric power from an electric power source;
    an accessory unit that is driven by electric power supplied from at least one of the battery and the charger;
    a charged amount obtaining unit that obtains a charged amount of the battery; and
    a controller that controls drive of the charger so that the charged amount of the battery obtained by the charged amount obtaining unit does not exceed a first charging upper limit when the accessory unit is not being driven, wherein for charging the battery using the supply of electric power from the electric power source, the controller stops a supply of the electric power from the charger to the accessory unit while allowing a supply of the electric power from the battery to the accessory unit when the charged amount of the battery exceeds a second charging upper limit that is lower than the first charging upper limit and the accessory unit is being driven.

2. The electrically-driven vehicle according to claim 1, further comprising a temperature detector that detects a battery temperature, wherein when the accessory unit is being driven, the controller changes the second charging upper limit in accordance with the temperature detected by the temperature detector.

3. The electrically-driven vehicle according to claim 1, wherein when the controller is capable of controlling charging using a plurality of types of control method, including a constant voltage control method in which charging is performed while estimating the charged amount and maintaining a constant voltage, the controller controls charging using a control method other than the constant voltage control method when the accessory unit is being driven.

4. The electrically-driven vehicle according to claim 1, wherein the electric power source is an external power supply provided externally to the vehicle.

5. A charge control system that controls a charging operation of a battery in an electrically-driven vehicle, comprising a chargeable and dischargeable battery charged by a supply of electric power from an electric power source, and an accessory unit driven by electric power supplied from at least one of the battery and the electric power source, the charge control system comprising:
    a charger that charges the battery using the supply of electric power from the electric power source;
    a charged amount obtaining unit that obtains a charged amount of the battery; and
    a controller that controls drive of the charger so that the charged amount of the battery obtained by the charged amount obtaining unit does not exceed a first charging upper limit when the accessory unit is not being driven, wherein for charging the battery using the supply of electric power from the electric power source, the controller stops a supply of the electric power from the charger to the accessory unit while allowing a supply of the electric power from the battery to the accessory unit when the charged amount of the battery exceeds a second charging upper limit that is lower than the first charging upper limit and the accessory unit is being driven.

\* \* \* \* \*